US009042821B2

United States Patent
Robert et al.

(10) Patent No.: US 9,042,821 B2
(45) Date of Patent: May 26, 2015

(54) SYSTEM FOR TRANSMISSION OF SIGNALS IN A DOMESTIC ENVIRONMENT

(75) Inventors: Jean-Luc Robert, Betton (FR); Ali Louzir, Rennes (FR); Dominique Lo Hine Tong, Rennes (FR); Jean-François Pintos, Saint Blaise du Buis (FR)

(73) Assignee: Thomson Licensing, Issy-les-Moulineaux (FR)

( * ) Notice: Subject to any disclaimer, the term of this patent is extended or adjusted under 35 U.S.C. 154(b) by 12 days.

(21) Appl. No.: 13/343,394

(22) Filed: Jan. 4, 2012

(65) Prior Publication Data
US 2013/0083833 A1 Apr. 4, 2013

(30) Foreign Application Priority Data

Jan. 6, 2011 (FR) .................................. 11 50088

(51) Int. Cl.
*H04B 3/26* (2006.01)
*H04B 7/02* (2006.01)
*H04B 17/00* (2006.01)
*H04B 7/04* (2006.01)
*H04B 7/06* (2006.01)
*H04B 7/00* (2006.01)

(52) U.S. Cl.
CPC .......... *H04B 17/0057* (2013.01); *H04B 7/0417* (2013.01); *H04B 7/0491* (2013.01); *H04B 7/0632* (2013.01); *H04B 7/0604* (2013.01); *H04B 17/318* (2015.01)

(58) Field of Classification Search
CPC . H04B 7/0617; H04B 7/0604; H04B 17/0057
USPC ............................................ 455/69, 63.4, 25
See application file for complete search history.

(56) References Cited

U.S. PATENT DOCUMENTS 7,630,732 B2    12/2009    Pan et al.
8,090,323 B2 *   1/2012    Craig et al. ................ 455/67.13
(Continued)

FOREIGN PATENT DOCUMENTS

EP          2169845      3/2010
KR       2009071301      7/2009
(Continued)

OTHER PUBLICATIONS

French Search Report dated Aug. 17, 2011.
(Continued)

*Primary Examiner* — Nay A Maung
*Assistant Examiner* — Maryam Soltanzadeh
(74) *Attorney, Agent, or Firm* — Myers Wolin LLC (57) ABSTRACT

The present invention relates to a wireless transmission system for signals intended more specifically for a domestic environment. It includes a central terminal comprising at least m transmission channels and n directive transmission antennas intended to transmit first signals at least one client terminal having at least one reception channel connected to a reception antenna in order to receive the first signals said central terminal and said client terminal communicating in a transmission channel having a predetermined frequency band, and an estimation device able to generate an item of information representative of the reception quality of first signals in at least one point of a predetermined geographic zone associated with the client terminal and a return channel in order to transmit said at least one item of information to the control means of the central terminal.

36 Claims, 3 Drawing Sheets

(56) References Cited

U.S. PATENT DOCUMENTS

| | | | |
|---|---|---|---|
| 8,531,288 B1* | 9/2013 | Khan et al. | 340/539.13 |
| 8,548,385 B2* | 10/2013 | Sofer et al. | 455/63.4 |
| 2005/0181823 A1 | 8/2005 | Haartsen | |
| 2005/0286650 A1 | 12/2005 | Han et al. | |
| 2006/0223449 A1 | 10/2006 | Sampath et al. | |
| 2007/0287473 A1* | 12/2007 | Dupray | 455/456.1 |
| 2009/0147876 A1 | 6/2009 | Ouyang | |
| 2009/0326339 A1* | 12/2009 | Horvitz | 600/301 |
| 2011/0021207 A1* | 1/2011 | Morgan et al. | 455/456.1 |
| 2012/0149390 A1* | 6/2012 | Gravely et al. | 455/456.1 |
| 2013/0203445 A1* | 8/2013 | Grainger et al. | 455/456.3 |

FOREIGN PATENT DOCUMENTS

| | | |
|---|---|---|
| WO | WO2009082179 | 7/2009 |
| WO | WO2009095744 | 8/2009 |

OTHER PUBLICATIONS

Kobayashi et al., How Much Training and Feedback are Needed in MIMO Broadcast Channels?, 2008 IEEE International Symposium on Information Theory Proceedings, vol. 1-6, pp. 2663-2667.

Plessky et al., "Review on SAW RFID Tags", IEEE Transactions on Ultrasonics, Ferroelectronics and Frequency Control, vol. 57, No. 3, Mar. 2009, pp. 654-668.

* cited by examiner

SYSTEM FOR TRANSMISSION OF SIGNALS IN A DOMESTIC ENVIRONMENT

This application claims the benefit, under 35 U.S.C. §119 of FR Patent Application 1150088, filed 6 Jan. 2011.

TECHNICAL DOMAIN OF THE INVENTION

The present invention relates to a wireless transmission system for signals intended more specifically for a domestic environment.

TECHNOLOGICAL BACKGROUND

The increase in the number of digital multimedia devices in residences has led to the appearance of domestic networks assuring the simultaneous distribution and at a high bitrate of data streams, such as High Definition (HD) video data streams, audio data streams or Internet data streams, these data being available at all or almost all points of the residence. Such a network, for which the structure is dependent on the distribution of rooms within the building (apartment, house with or without a second floor, etc.) in which it is installed, can be deployed using different technologies such as cable, Power Line Carrier (PLC), optical fibre or WiFi type wireless devices complying with the standards 802.11a/b/g or 11n. This latter standard authorizes the use of MIMO (Multiple Input Multiple Output) technology that is a multi-antenna technique enabling transmission efficiency to be improved in terms of bitrate and robustness in environments dominated by interferences.

These new solutions based on the standard 802.11n and the MIMO technologies each however have their own specificity according to the MIMO technique used. What follows is a reminder of the fundamental principles of MIMO technology.

The principle of MIMO systems is to transmit and/or receive signals via several transmission channels in order to obtain independent signals and increase the probability that at least one of the signals is not or is only slightly affected by fading. MIMO topologies can be broken down into two main categories:

- systems called open loop systems, in which the transmission is implemented without previous knowledge of the propagation channel, these systems use Spatial Multiplexing (also called MIMO Matrix B) techniques or Space Time Block Coding (also called MIMO Matrix A) techniques, and
- systems called closed loop systems, using the Beamforming technique and comprising a return channel to transmit, to the transmitter, information relating to the transmission channel.

To summarize, spatial multiplexing (MIMO Matrix B) consists in dividing the stream of data to be transmitted into a plurality of elementary streams and in transmitting each of these elementary streams with a radio channel and a specific antenna. In the presence of multiple paths, as is the case in an indoor environment, the different elementary streams attain the receiver with a different spatial signature, thus enabling them to be easily differentiated. In an ideal environment and over short distances, this technique multiplies the physical bitrate and consequently the overall transmission capacity of the system. For longer distances or in more difficult conditions for transmission (poor signal to noise ratio), the bitrate deteriorates rapidly. This deterioration being essentially due to the fact that the transmitter has no information on the state of the transmission channel. The transmission cannot thus be adapted in accordance to it.

The other open loop technique, space time block coding (MIMO Matrix B), that is also blind concerning the state of the transmission channel, gives priority to robustness and diversity is contrast to the previously cited spatial multiplexing. The stream of data to be transmitted is replicated and transmitted, after coding, via several radio channels and associated antennas. Each of these streams is encoded via a known spatio-temporal coding algorithm. This technique is often used to increase the coverage zone of the system. As for the spatial multiplexing, this technique does not provide for a return channel in order to receive information on the transmission channel. The transmission cannot thus be adapted in accordance to it.

Finally the beamforming technique is employed in order to control the direction and the form of the radiation pattern of the transmission antenna, in order to thus increase the power in the selected transmission direction. This technique improves the transmission in the selected direction and the resistance to interferences and noise. The transmission capacity of the system can be increased in this way. Beamforming in transmission is theoretically the optimal means for transmitting via a multiple antenna system. This technique provided with channel information procures a gain of 6 dB for 2 antennas (or 12 dB for 4 antennas). In addition, it can be combined with other techniques such as spatial multiplexing and thus leads to very high transmission capacities.

The configurations according to the 802.11n standard that are currently most common on the market are of 2×2:2 type (2 transmission channels, 2 reception channels and 2 spatial streams), 2×3:2 or 3×3:2. The majority of these systems do not have a return channel required for the implementation of the beamforming technique. In reception, it is known to use an item of information called CSI (Channel State Information) in order to determine the state of the transmission channel and to demodulate the symbols received according to it. The CSI information is generally obtained by means of training symbols transmitted with the useful symbols. For the transmission, a return channel will be required in order to transmit an item of CSIT (Channel State Information at Transmitter) information to the transmitter in order to adapt the signals transmitted to the transmission conditions. But, this return channel is not implemented in MIMO technology due to the complexity of the implementation of this return channel.

Currently, some systems implement therefore the technique called "implicit beamforming" defined in the standard 802.11n. According to this technique, it is considered that the transmission channel is reciprocal. For example, if a system comprising a central terminal communicating with a client terminal is considered, the central terminal calculates the direction matrix of beams without the addition of information from the client terminal. It does this by estimating the uplink channel (client terminal to central server), for example by analysing the preamble of signals received. The central terminal then transmits signals to the client terminal considering that the downlink channel is reciprocal (i.e. identical or almost identical to the uplink channel). This reciprocal hypothesis is not valid in an environment dominated by interferences and rich in multiple paths corresponding to a domestic environment.

A beamforming type solution at transmission would be more appropriate for such environments. But as indicated previously, its implementation would lead to a significant increase on the processing part of the signal in the transmitter due to the great number of MIMO antennas and radio channels associated. Such a solution would be complex to implement, energy consuming and costly.

One purpose of the invention is to overcome the disadvantages described above.

SUMMARY OF THE INVENTION

The solution proposed resides in the association of a standard transmission system of MIMO type (without return channel) comprising a central terminal and at least one client terminal, with on one hand, a network of sectored type directive antennas at transmission and on the other hand, a pseudo return channel external to the MIMO transmission system to recover information on the environment from each of the client terminals to the central terminal. Control means ensure the processing of recovered information and consequently control the selection matrix of directive antennas of the central terminal.

In addition, the purpose of the invention is a transmission system of signals comprising:
- a central terminal comprising at least m transmission channels and n transmission antennas intended to transmit first signals, with n>m>1, switching means for associating with each signal transmission channel one antenna from among the n antennas according to a switching schema selected by the control means,
- at least one client terminal comprising at least one reception channel connected to a reception antenna in order to receive first signals transmitted via the central terminal being able to communicate in a transmission channel having a predetermined frequency band, characterized in that, the transmission antennas are directive antennas, each transmission antenna being able to transmit first signals in a predetermined angular sector, and in that the system also comprises an estimation device able to generate at least one item of information on the reception quality of first signals transmitted by the central terminal in at least one point of a predetermined geographic zone associated with the client terminal and a return channel to transmit said at least one item of information to the control means of the central terminal, said control means selecting a switching schema according to said at least one item of information.

Thus, according to the invention, the system comprises a return channel in order to transmit to the central terminal information on the reception quality in at least one point of the zone of the client terminal so that central terminal selects, according to said information, a switching schema optimising the reception. This return channel is independent of the MIMO subsystem formed of the central terminal and the client terminal.

According to an advantageous characteristic, the estimation device comprises:
- close to the central terminal, a transmission circuit able to transmit, via at least one of the directive antennas selected for said client terminal, a second signal called the interrogation signal in a frequency band close to or identical to the predetermined frequency band of the transmission channel between the central terminal and the client terminal, and
- in the geographic zone associated with the client terminal, a measurement circuit able to measure the power of the interrogation signal in said zone, the measurement being representative of the quality of reception of first signals in said zone.

The geographic zone associated with the client terminal is for example the room of the residence in which said client terminal is present.

Thus, the interrogation signal being transmitted with a frequency close to or equal to that of the first signals transmitted via the central terminal, it experiences the same variations as these latter. A measurement of the interrogation signal received via the measurement circuit placed in the geographic zone of the client terminal thus enables the variations of the transmission channel to be determined between the central terminal and a point of the zone associated with the client terminal.

According to a particular embodiment, the measurement circuit comprises at least one RFID (Radio Frequency IDentification) sensor associated with an RFID reader, said at least one RFID sensor being able to receive the interrogation signal, to code it according to a coding parameter relating to an identifier of the RFID sensor and to transmit the coded signal to said RFID reader, and said RFID reader being able to generate, from said coded signal, an item of information representative of the reception quality of first signals in the geographic zone associated with the client terminal.

Advantageously, the measurement circuit comprises an RFID sensor located on the client terminal to determine precisely the variations of the transmission channel between the central terminal and the client terminal.

According to a particular embodiment, the measurement circuit comprises a plurality of RFID sensors spread over a plurality of fixed points of the zone associated with the client terminal in order to obtain the state of the transmission channel in several points of the zone and be able to advantageously predict the changes in the transmission channel at the level of the client terminal. The number of sensors varies according to the size of the geographic zone associated with the client terminal and the precision desired for the estimation of the transmission channel over the zone.

In this embodiment, each RFID sensor receives the interrogation signal then the code with it identifier and transmits the coded signal to the RFID reader. The RFID reader is located at a fixed point of the zone associated with the client terminal.

According to a particular embodiment, each RFID reader comprises means for measuring the received power of coded signals transmitted by the RFID sensors of the zone and a processing circuit to decode the received signals, to determine for each signal received the identifier of the sensor having transmitted said signal and to generate a signal comprising, for each coded signal received, the received power and the identifier.

According to a particular embodiment, the transmission circuit noticeably transmits periodically an interrogation signal to the measurement circuit of the zone during a specific temporal interval. During this interval, the central terminal does not transmit first signals.

According to a particular embodiment, the system comprises a plurality of client terminals with each of which is associated a geographic zone. In each of the geographic zones, the measurement circuit comprises at least one RFID sensor and an associated RFID reader. In this embodiment, the transmission circuit transmits for each of the geographic zones an interrogation signal to the RFID sensor(s) of the geographic zone during a specific temporal interval.

Each of the geographic zones is thus interrogated separately during different temporal intervals.

According to an advantageous embodiment, the RFID sensor is a surface acoustic wave passive sensor. The RFID sensors are for example in the form of labels, preferably adhesive.

The interrogation signals are pulse trains.

According to a particular embodiment, the control means select a switching schema from among a plurality of predetermined switching schemas of a switching matrix according to said at least one item of information transmitted via said return channel.

According to a preferred embodiment, the return channel is a wireless transmission channel operating for example according to the "ZigBee" or "Zwave" standard.

In a variant, the return channel is a wired channel, for example of Power Line Carrier (PLC) type.

BRIEF DESCRIPTION OF THE FIGURES

The invention will be better understood, and other aims, details, characteristics and advantages will appear more clearly over the course of the detailed description which follows in referring to the figures in the appendix, showing in.

DETAILED DESCRIPTION OF EMBODIMENTS

Figure 1:
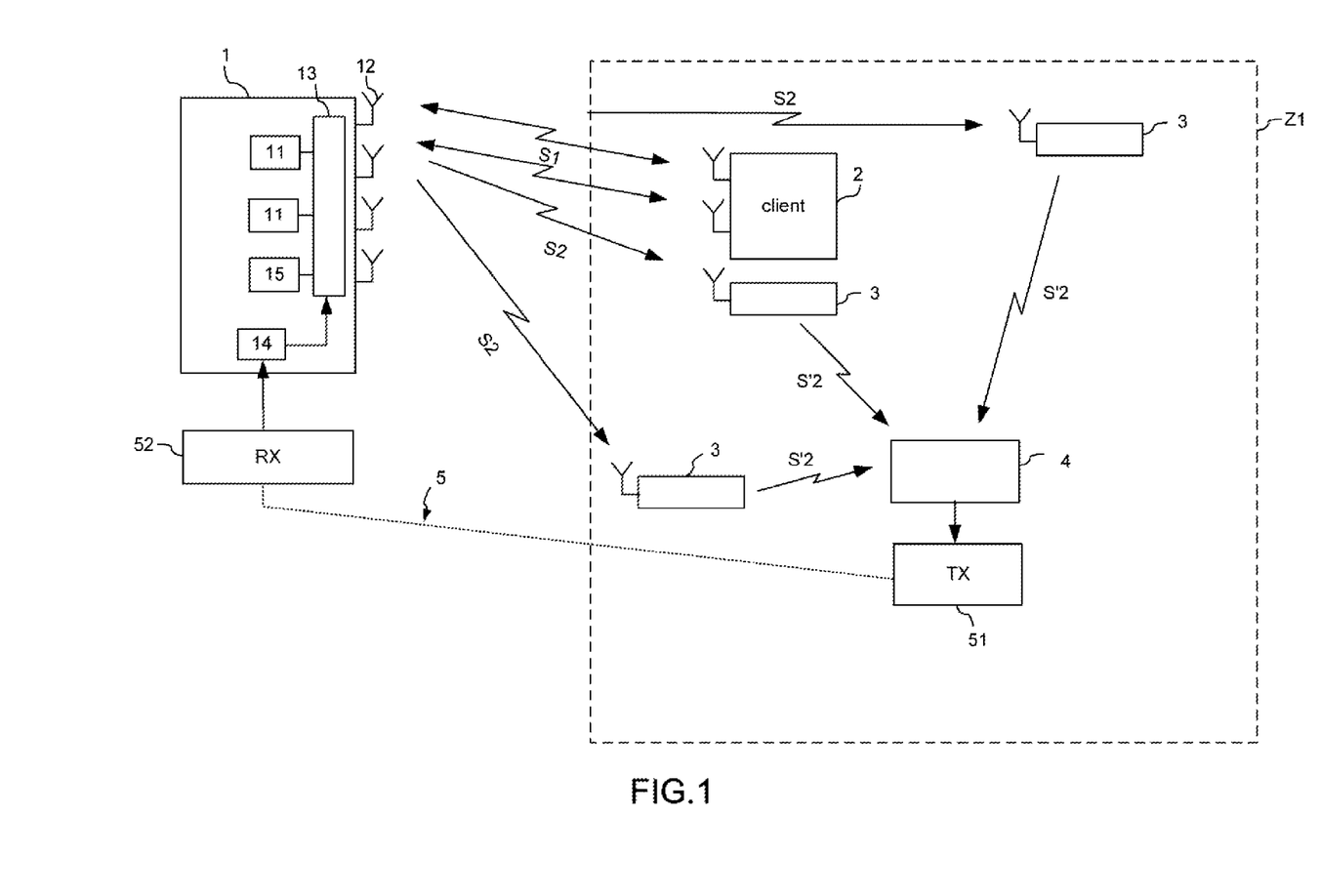
FIG. 1, the schema of a system in accordance with the invention comprising a central terminal communicating with a client terminal positioned in a geographic zone Z1, FIG. 2, a schema showing a set of RFID sensors located in the zone Z1 according to a mesh network, FIG. 3, a diagrammatic view of a surface acoustic wave RFID sensor, and FIG. 4, the schema of a system in accordance with the invention comprising a central terminal communicating with two client terminals positioned in two geographic zones Z1 and Z2.

In reference to FIG. 1, the signals transmission system comprises a central terminal or access point 1 equipped with a plurality of transmission channels 11 and a plurality of directive transmission antennas 12 to transmit signals S1 compliant with, for example, the wireless communication standard 802.11n to at least one client terminal 2.

The access point 1 is for example located close to an Internet network access and communicates with a client terminal 2, that is for example a multimedia terminal such as a computer, a television, a 3G telephone or an Internet network connector.

The access point 1 comprises m transmission channels 11 and n transmission antennas 12, with n>m>1. It also comprises switching means 13 in order to associate with each of the m signal transmission channels one antenna among the n antennas according to a switching schema selected by the control means 14. According to a particular embodiment, the switching schema is selected from among a plurality of predetermined switching schemas of a switching matrix stored in the switching means 13.

In the example of FIG. 1, the access point comprises two transmission channels 11 and four directive antennas 12. The switching means 13 enable the two transmission channels to be connected to two of the four directive antennas in order to transmit signals compliant with the 802.11n standard to the client terminal.

The signals S1 are transmitted in a transmission channel in the 2.4 GHz WiFi frequency band, namely the band [2.4 GHz-2.483 GHz].

According to the invention, the antennas 12 are directive antennas and thus each transmit signals in a specific angular sector. The client terminal 2, that is located in a geographic zone Z1 corresponding for example to a room of a building, receives the signals S1 via one or several antennas.

According to an important characteristic of the invention, the system also comprises an estimation device in order to generate information representative of the quality of the reception of signals S1 by the client terminal 2 and a return channel 5 in order to transmit this information to the control means 14 of the access point. The control means 14 select then a switching schema according to information received via the return channel.

The estimation device comprises essentially, at the level of the access point, a transmission circuit 15 in order to transmit punctually or periodically an interrogation signal S2 in the WiFi band or in a frequency band close to this and, in the zone Z1 associated with the client terminal 2, at least one RFID sensor 3 associated with an RFID reader 4. In the example of FIG. 1, the estimation device comprises a plurality of RFID sensors 3 in the zone Z1. The RFID sensors 3 and the RFID reader 4 form a measurement circuit able to measure the power of the interrogation signal S2 at a plurality of points of the zone Z1.

The access point communicates with the client terminal and the RFID sensors according to a TDMA (Time Division Multiple Access) mode. The access point transmits the signals S1 for a time period T1 and the signals S2 for a time period T2, with T2<<T1, the times T1 and T2 being non-overlapping.

Each RFID sensor 3 is intended to receive the interrogation signal S2, to code it with a coding parameter relating to an RFID sensor identifier and to transmit the coded signal S'2 to the RFID reader 4. The RFID reader 4 receives the signal transmitted via the RFID sensor and generates, from this, an item of information representative of the quality of reception of signals at the point of the zone Z1 where the sensor is located.

The RFID sensors 3 are arranged at fixed points of the zone Z1. A sensor is also advantageously located directly on the client terminal when this latter is fixed. The RFID sensors are advantageously in the form of adhesive labels stuck on the client terminal or on an element of the room where the client terminal is placed. The sensors are preferably surface acoustic wave passive sensors. These latter elements are devices with strong linearity, this means that if a strong signal is received by the sensor, the response signal will be equally strong and, if a weak signal is received, the response signal will be weak. The power of the signal received by the RFID reader is thus noticeably proportional to the power of the signal received by the RFID sensor. The sensors will be described later in reference to FIG. 3.

The RFID reader 4 is also located at a fixed point of the zone Z1 or on the client terminal. It comprises means for measuring the received power of signals transmitted by the RFID sensors of the zone Z1 and a processing circuit to decode the received signals, to determine for each signal received the identifier of the sensor having transmitted said signal and to generate a signal comprising, for each coded signal received, the received power and the identifier. The signal generated by the RFID reader is then transmitted to the control means 14 via the return channel 5.

The return channel 5 is a wireless transmission channel operating for example according to the standard "ZigBee" or "Zwave", or a wired channel via for example a Power Line Carrier (PLC). For this purpose, it comprises a transmitter 51 at the level of the client terminal 2 and a receiver 52 at the level of the access point 1. The receiver 52 is connected to the control means 14.

The control means 14 analyse the information transmitted via the return channel and select a switching schema according to this information. If the reception quality is not sufficient, the control means 14 modify the switching schema in a way to select other antennas 12 for the transmission of signals S1.

Figure 2:
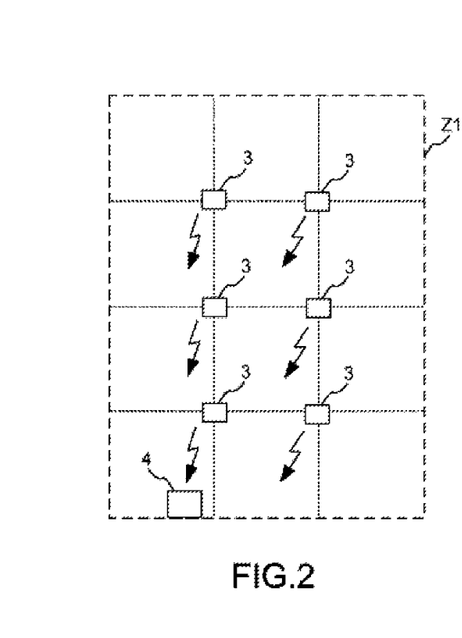

The RFID sensors 3 are for example located at precise points of the zone Z1, for example according to a regular network as shown in FIG. 2. In this figure, the sensors 3 are located at the nodes of a mesh network. All these sensors enable the changes in the power received at different points of the zone Z1 to be analysed. These sensors are based on the piezoelectric effect and, in the case of acoustic wave surface sensors, do not require any exterior energy. They can be positioned on metallic objects or surfaces without malfunctions and operate in the band ISM 2.45 GHz, in the same frequency band as the MIMO or MISO system formed by the access point and the client terminal. The result is a similarity in transmission channel behaviour between the MIMO or MISO system and the estimation device.

Each surface acoustic wave passive sensor operates like a reflector of the interrogation signal S2 and requires radiofrequency pulses in the order of 10 mW only in the interrogation signal.

Figure 3:
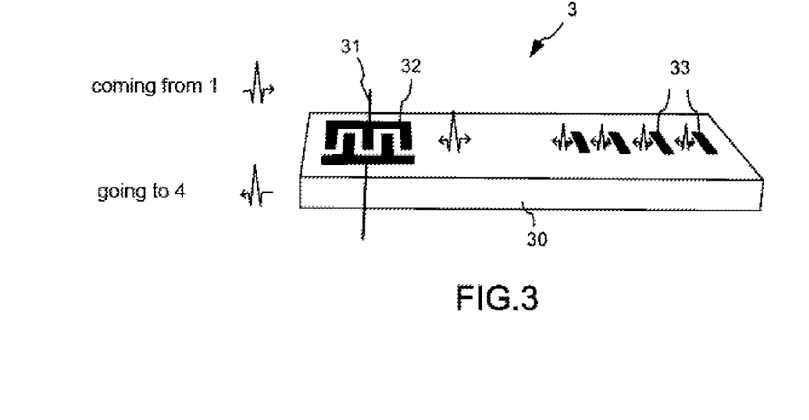

In a surface wave component, the transduction between the electric signal and the acoustic wave is obtained via an interdigital metallic network or interdigital transducer located on the surface of a piezoelectric substrate. Such a surface acoustic wave sensor is shown in FIG. 3. It comprises a substrate 30 on which is mounted an antenna 31, an interdigital transducer 32 connected to the antenna and a plurality of reflectors 33 placed at very precise positions on the substrate.

The access point 1 transmits the interrogation signal S2 that is for example a pulse train at 2.45 GHz. The pulses are captured by the antenna 31 that transmits them to the transducer 32. This latter transforms the microwave signal into an electro-acoustic wave. The acoustic pulses generated thus propagate on the piezoelectric substrate and are partially reflected by the reflectors 33. The waves reflected to the transducer carry a code based on the positions of reflectors. This coding is based on the delay time of reflected pulses introduced by the reflectors 33. The code thus introduced in the signal corresponds to an identifier specific to the sensor. The reflected pulse train returns to the transducer and is reconverted by it into an electric signal S'2, which is re-transmitted by the antenna 31 to the RFID reader 4. This position coding procures a great number of possible codes and, likewise, of identifiers for the RFID sensors, this number varying according to the number of reflectors and the spacing possible between the reflectors. According to the invention, each sensor thus has a unique identifier.

The signal coded by the RFID sensor is transmitted to the RFID reader 4. Means of the RFID reader measure the level of power of the signal received by it. The received signal is then analysed via a processing circuit of the RFID reader 4. The processing circuit determines the identifier coded in the signal received and generates a signal comprising a pair (received power—identifier) for each signal received. The RFID reader 4 then transmits this signal to the control means 14 via the return channel 5.

As indicated previously, the return channel 5 is for example a "ZigBee" type wireless transmission channel. Advantageously, it operates in beacon mode, that is to say it periodically transmits information from the RFID reader to the control means of the access point. The transmission of the interrogation signal S'2 is synchronised on the beacon mode of the return channel. It is this latter that cyclically triggers the transmission of the interrogation signal S2 to the RFID sensors of the zone Z1.

For the transmission of the interrogation signal S2, the switching means 13 comprise an additional input to connect the transmission circuit 15 of the interrogation signal to at least one of the antennas used for the WiFi link.

Note that, within a same zone, the distance between the RFID reader and each of the RFID sensors is relatively low (in the order of a few meters). In addition, the RFID sensors are generally in direct line of view with the RFID reader. Also, the surface acoustic wave RDID sensors being devices with strong linearity, the power received by the RFID reader is noticeably proportional to the power received by the RFID sensor. Advantageously, the distance between the RFID sensor and the RFID reader is taken into account by the processing circuit of the RFID reader in order to correct the level of power received by the RFID reader so that it is as representative as possible of the level of power received by the RFID sensor. The distance parameter is for example determined during the calibration phase. Each RFID sensor of the zone is for example interrogated by the RFID reader in the form of the transmission of a signal of a given power. The RFID sensor re-transmits a response signal that is processed by the RFID reader in order to determine the distance between the RFID sensor and the RFID reader. This distance parameter is memorised in the RFID reader and serves in the correction of levels of power received. This calibration phase can be repeated cyclically. It can be very useful when an RFID sensor is mounted on a mobile client terminal, for example on a portable computer, an IPhone or a WiFi tablet.

Figure 4:
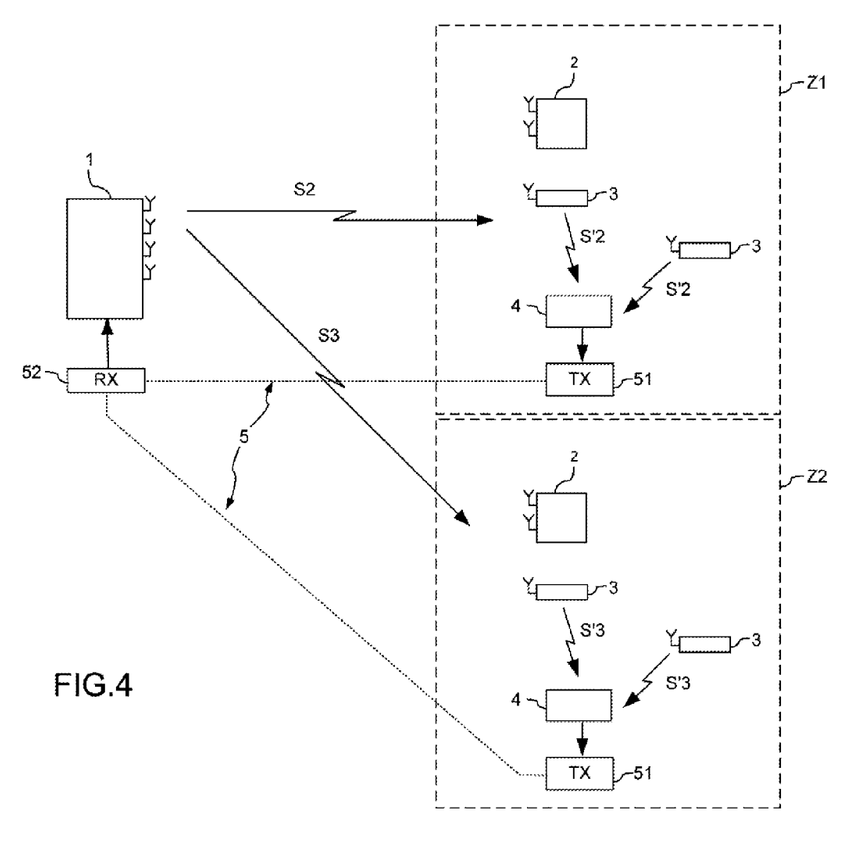

The system of the invention can also comprise a plurality of client terminals located in a plurality of geographic zones. FIG. 4 shows the caser of a system comprising an access point 1 and two client terminals 2 located in two distinct zones Z1 and Z2. Each zone comprises a plurality of RFID sensors 3 and an RFID reader 4. The transmission circuit 15 transmits interrogation signals S2 intended for the RFID sensors of the zone Z1 and signals S3 intended for the RFID sensors of the zone Z2 according to a TDMA mode. The RFID sensors of the zone Z1 (respectively Z2) re-transmit a coded signal S'2 (respectively S'3) to the RFID reader of the zone Z1 (respectively Z2). The RFID readers analyse the signals received and transmit, via the return channel 5, to the control means 14 information representative of the quality of reception in the zones Z1 and Z2.

Note that the return channel, such as a "ZigBee" network, may be already present in the building where the system of the invention is installed to manage the building control functions such as lighting and building temperature.

Although the invention has been described in relation to different particular embodiments, it is obvious that it is in no way restricted and that it comprises all the technical equivalents of the means described together with their combinations if the latter fall within the scope of the invention.

What is claimed is:

1. A system for transmission of signals, the system comprising:
   a central terminal comprising at least m signal transmission channels and at least n transmission antennas for transmitting a plurality of first signals, with n>m>1, a switching device for associating each of the signal transmission channels with a first antenna from among the n transmission antennas according to a switching schema selected by a control device,
   at least one client terminal comprising at least one reception channel connected to a reception antenna in order to receive a first signal transmitted via the central terminal, said central terminal and said client terminal being able to communicate in a transmission channel having a predetermined frequency band, wherein, the transmission antennas are directive antennas and each of the transmission antennas are configured to transmit the first signals in a predetermined angular sector, the system further comprising:

an estimation device comprising a transmission circuit for transmitting a second signal to at least one point of a predetermined geographic zone associated with the client terminal;

in said geographic zone, a measurement circuit comprising an RFID sensor associated with an RFID reader for measuring said second signal and to generate, from the measurement of said second signal, an item of information representative of a reception quality of the first signals; and a return channel for transmission of said at least one item of information from the measurement circuit to the control device of the central terminal, said control device selecting a switching schema for the transmission antenna according to said at least one item of information.

2. The system according to claim 1, wherein the transmission circuit of the estimation device is configured to transmit, via at least one of the directive antennas selected for said client terminal, the second signal in a frequency band identical to the predetermined frequency band, and the measurement circuit is configured to measure the power of the second signal in the geographic zone associated with the client terminal.

3. The system according to claim 2, wherein, said at least one RFID sensor is configured to receive the second signal, to code the second signal according to a coding related to the identifier of said RFID sensor and to transmit the coded signal to said RFID reader, and said RFID reader is configured to generate, from said coded signal, the item of information representative of the quality of reception of the first signal in the geographic zone associated with the client terminal.

4. The system according to claim 3, wherein the measurement circuit comprises an RFID sensor located on the client terminal.

5. The system according to claim 3, wherein the measurement circuit comprises a plurality of RFID sensors distributed over a plurality of fixed points of the zone associated with the client terminal.

6. The system according to claim 5, wherein the RFID reader is located at a first fixed point of the zone, the first fixed point of the zone being associated with the client terminal.

7. The system according to claim 6, wherein each RFID reader is configured to measure the received power of the coded signals transmitted by the RFID sensors of the zone and comprises a processing circuit to decode the received signals, to determine for each signal received the identifier of the sensor having transmitted said signal and to generate a signal comprising, for each coded signal received, the received power and the identifier.

8. The system according to claim 2, wherein the transmission circuit transmits periodically the second signal to the measurement circuit of the zone during a specific temporal interval.

9. The system according to claim 2, wherein the transmission circuit transmits for each of said geographic zones the second signal to the RFID sensor(s) of said geographic zone during a specific temporal interval.

10. The system according to claim 3, wherein each RFID sensor is a surface acoustic wave passive sensor.

11. The system according to claim 2, wherein the second signal is a pulse train.

12. The system according to claim 1, wherein the control device is configured to select the switching schema from among a plurality of predetermined switching schemas of a switching matrix according to said at least one item of information transmitted via said return channel.

13. The system according to claim 1, wherein the return channel is a wireless transmission channel operating according to a ZigBee or Zwave standard.

14. A central terminal comprising:

a plurality of transmission channels and a plurality of transmission antennas for transmission of a first signal to a client terminal via a transmission channel having a predetermined frequency band, the plurality of transmission antennas being greater than the plurality of transmission channels, the transmission antennas are directive antennas, wherein each of the transmission antenna are configured to transmit the first signals in a predetermined angular sector;

a switching device for associating each of the plurality of signal transmission channels with one transmission antenna from among the plurality of transmission antennas according to a switching schema selected by a control device;

an estimation device comprising a transmission circuit for transmitting a second signal to a measurement device in a geographical zone associated with the client terminal;

a measurement circuit, in said geographic zone, comprising an RFID sensor and an RFID reader for measuring said second signal to determine at least one item of information on the reception quality of the first signals;

a return channel for receiving, from the measurement circuit, the at least one item of information on the reception quality of the first signals; and a control device for selecting a switching schema for the transmission antenna according to said at least one item of information.

15. A client terminal comprising:

at least one reception channel connected to a reception antenna receiving a first signal transmitted from a central terminal, at a predetermined frequency band;

a measurement circuit comprising an RFID sensor and an RFID reader for measuring a second signal transmitted from the central terminal and generating, from the measurement of said second signal, an item of information on the reception quality of the first signal; and a return channel for transmitting said at least one item of information from the measurement circuit to the central terminal.

16. The central terminal according to claim 14, wherein the transmission circuit of the estimation device is configured to transmit, via at least one of the directive antennas selected for said client terminal, the second signal in a frequency band identical to the predetermined frequency band and the measurement circuit is configured to measure the power of the second signal in the geographic zone associated with the client terminal.

17. The central terminal according to claim 16, wherein said at least one RFID sensor is configured to receive the second signal, to code the second signal according to a coding relating to the identifier of said RFID sensor and to transmit the coded signal to said RFID reader, and said RFID reader is configured to generate, from said coded signal, the item of information representative of the quality of reception of the first signal in the geographic zone associated with the client terminal.

18. The central terminal according to claim 17, wherein the measurement circuit comprises a plurality of RFID sensors distributed over a plurality of fixed points of the zone associated with the client terminal.

19. The central terminal according to claim 18, wherein the RFID reader is located at a first fixed point of the zone, the first fixed point of the zone being associated with the client terminal.

20. The central terminal according to claim 19, wherein each RFID reader is configured to measure the received power of the coded signals transmitted by the RFID sensors of the zone and a processing circuit to decode the received signals, to determine for each signal received the identifier of the sensor having transmitted said signal and to generate a signal comprising, for each coded signal received, the received power and the identifier.

21. The central terminal according to claim 16, wherein the transmission circuit transmits periodically the second signal to the measurement circuit of the zone during a specific temporal interval.

22. The central terminal according to claim 16, wherein the transmission circuit transmits for each of said geographic zones the second signal to the RFID sensor(s) of said geographic zone during a specific temporal interval.

23. The central terminal according to claim 17, wherein each RFID sensor is a surface acoustic wave passive sensor.

24. The central terminal according to claim 16, wherein the second signal is a pulse train.

25. The central terminal according to claim 14, wherein the control device is configured to select the switching schema from among a plurality of predetermined switching schemas of a switching matrix according to said at least one item of information transmitted via said return channel.

26. The client terminal according to claim 15, wherein the measurement circuit comprises an RFID sensor located on the client terminal.

27. The client terminal according to claim 15, wherein the return channel is a wireless transmission channel operating according to a ZigBee or Zwave standard.

28. A method of transmission, the method comprising:
associating each of a plurality of signal transmission channels with one transmission antenna from among a plurality of transmission antennas according to a switching schema selected by a control device; the plurality of transmission antennas being greater than the plurality of transmission channels
transmitting a first signal to a client terminal via one of the transmission channels having a predetermined frequency band and one of the transmission antennas configured to transmit the first signal in a predetermined angular sector;
transmitting a second signal to a measurement device in a geographical zone associated with the client terminal;
measuring in said geographic zone, using a measurement circuit comprising an RFID sensor and an RFID reader, said second signal to determine at least one item of information on the reception quality of the first signals;
receiving via a return channel from the measurement circuit, the at least one item of information on the reception quality of the first signals; and
selecting a switching schema for the transmission antenna according to said at least one item of information.

29. A method of reception, the method comprising:
receiving a first signal transmitted from a central terminal, at a predetermined frequency band;
measuring, using a measurement circuit comprising an RFID sensor and an RFID reader, a second signal transmitted from the central terminal and
generating, from the measurement of said second signal, an item of information on the reception quality of the first signal; and
transmitting, via a return channel, said at least one item of information from the measurement circuit to the central terminal.

30. The method according to claim 28 comprising
transmitting, via at least one of the directive antennas selected for said client terminal, the second signal in a frequency band identical to the predetermined frequency band and measuring the power of the second signal in the geographic zone associated with the client terminal.

31. The method according to claim 30, comprising
at the RFID sensor, receiving the second signal, coding the second signal according to a coding related to the identifier of said RFID sensor and transmitting the coded signal to said RFID reader, and
at the RFID reader, generating, from said coded signal, the item of information representative of the quality of reception of the first signal in the geographic zone associated with the client terminal.

32. The method according to claim 31, comprising at the RFID reader
measuring the received power of the coded signals transmitted by the RFID sensors of the zone
decoding the received signals, to determine for each signal received the identifier of the sensor having transmitted said signal and
generating a signal comprising, for each coded signal received, the received power and the identifier.

33. The method according to claim 28, comprising periodically transmitting the second signal to the measurement circuit of the zone during a specific temporal interval.

34. The method according to claim 28, wherein the transmission circuit transmits for each of said geographic zones the second signal to the RFID sensor(s) of said geographic zone during a specific temporal interval.

35. The method according to claim 28, wherein the second signal is a pulse train.

36. The method according to claim 28 comprising selecting the switching schema from among a plurality of predetermined switching schemas of a switching matrix according to said at least one item of information transmitted via said return channel.

* * * * *